US006850217B2

(12) United States Patent
Huang et al.

(10) Patent No.: US 6,850,217 B2
(45) Date of Patent: Feb. 1, 2005

(54) OPERATING METHOD FOR ACTIVE MATRIX ADDRESSED BISTABLE REFLECTIVE CHOLESTERIC DISPLAYS

(75) Inventors: Xiao-Yang Huang, Stow, OH (US); Nick Martin Miller, IV, Rootstown, OH (US)

(73) Assignee: Manning Ventures, Inc., Southfield, MI (US)

( * ) Notice: Subject to any disclaimer, the term of this patent is extended or adjusted under 35 U.S.C. 154(b) by 0 days.

(21) Appl. No.: 09/836,329

(22) Filed: Apr. 18, 2001

(65) Prior Publication Data

US 2001/0050666 A1 Dec. 13, 2001

Related U.S. Application Data

(60) Provisional application No. 60/200,001, filed on Apr. 27, 2000.

(51) Int. Cl.[7] ................................. G09G 3/36
(52) U.S. Cl. ........................ 345/97; 345/88; 345/211; 349/49
(58) Field of Search .............. 345/87–100, 211–212; 349/37, 41, 42, 49

(56) References Cited

U.S. PATENT DOCUMENTS

| | | |
|---|---|---|
| 4,042,854 A | 8/1977 | Luo et al. |
| 4,062,626 A | 12/1977 | Kawakami et al. |
| 4,094,582 A | 6/1978 | Goodman |
| 4,112,333 A | 9/1978 | Asars et al. |
| 4,223,308 A | 9/1980 | Baraff et al. |
| 4,404,555 A | 9/1983 | Long et al. |
| 4,717,244 A | 1/1988 | Hilsum et al. |
| 4,818,981 A | 4/1989 | Oki et al. |
| 4,921,334 A | 5/1990 | Akodes |
| 5,251,048 A | 10/1993 | Doane et al. |
| 5,379,051 A * | 1/1995 | Suga et al. ............. 345/97 |
| 5,384,067 A | 1/1995 | Doane et al. |
| 5,453,863 A | 9/1995 | West et al. |
| 5,570,216 A | 10/1996 | Lu et al. |
| 5,583,677 A | 12/1996 | Ito et al. |
| 5,587,819 A | 12/1996 | Sunohara et al. |
| 5,608,418 A | 3/1997 | McNally |
| 5,644,330 A | 7/1997 | Catchpole et al. |
| 5,677,704 A | 10/1997 | Kusamo et al. |
| 5,712,651 A | 1/1998 | Tomiyasu |
| 5,730,900 A | 3/1998 | Kawata |
| 5,748,277 A | 5/1998 | Huang et al. |

(List continued on next page.)

OTHER PUBLICATIONS

"Bistable reflective cholesteric liquid crystal display" by Min–Hua Lu,—Kent Display Systems, J. Appl. Phys. vol. 81, No. 3, Feb. 1, 1997.
"Active Matrix LC Displays" by F.C. Luo, GE–Aircraft Electronics Division, c/o Corporate Research & Development Center.
Doane, W.J. and Stefanov, M.E., "Reflective Cholesteric Liquid–Crystal Displays", Information Display 12/96.

(List continued on next page.)

Primary Examiner—Amr Awad
(74) Attorney, Agent, or Firm—Pearne & Gordon LLP

(57) ABSTRACT

An operating method for a color display system including an active matrix bistable liquid crystal display (LCD) having a plurality of pixels arranged in a matrix based on color data and status bits corresponding to each of the pixels stored in a memory includes steps for generating voltage data corresponding to the pixels based on the color data and the status bits stored for each of the pixels, converting the voltage data to drive signals suitable for driving the active matrix bistable LCD, and applying the drive signals to the active matrix bistable LCD. In an exemplary embodiment, the active matrix bistable LCD is a Cholesteric LCD. Advantageously, the generating, converting, and applying steps are repeated for a corresponding pixel N times, where N is an integer established by the status bits.

35 Claims, 11 Drawing Sheets

U.S. PATENT DOCUMENTS

| | | | |
|---|---|---|---|
| 5,766,509 A | | 6/1998 | Kawata et al. |
| 5,793,347 A | | 8/1998 | Mugridge |
| 5,844,537 A | | 12/1998 | Bonnett et al. |
| 5,917,465 A | | 6/1999 | Mochizuki et al. |
| 5,933,203 A | | 8/1999 | Wu et al. |
| 5,940,060 A | | 8/1999 | Raynes et al. |
| 5,986,724 A | * | 11/1999 | Akiyama et al. ............. 349/41 |
| 6,046,725 A | | 4/2000 | Yoon |
| 6,054,974 A | * | 4/2000 | Sakai et al. .................... 345/98 |
| 6,094,244 A | | 7/2000 | Kawata et al. |
| 6,133,895 A | | 10/2000 | Huang |
| 6,288,722 B1 | | 9/2001 | Narayanaswami |
| 6,348,910 B1 | * | 2/2002 | Yamamoto et al. ......... 345/102 |
| 6,396,465 B1 | | 5/2002 | Nakagiri |

OTHER PUBLICATIONS

Yank, D.K., Doane, J.W., Yaniv, Z., Glasser, J., "Cholesteric reflective display: Drive scheme and contrast" Appl. Phys. Lett. 64(15), Apr. 11, 1994, ©1994 American Institute of Physics.

Crawford, G.P., Polack, R.D., Scharkowski, A., Chien, L.C., Zumer, S., and doane, J.W., "Captured liquid crystalline order in polymer networks". 34/SPIE vol. 2175.

"Liquid Crystal Materials, Devices, and Applications III", SPIE—The International Society for Optical Engineering, vol. 2175.

"39.2: Design of PSCT Materials for MIM Addressing" by M. Pfeiffer, Y. Sun, D–K. Yang, J.W. Doan, W. Sautter, V. Hochholzer, E. Ginter, E. Lueder, Z. Yaniv. SID 94 Digest.

"22.3: Dynamic Drive for Bistable Reflective Cholesteric Displays: A Rapid Addressing Scheme", by X.Y. Huang, D.K. Yang, P.J. Bos, J.W. Doane. SID 95 Digest 347.

"23.3: High Performance Dynamic Drive Scheme for Bistable Reflective Cholesteric Displays", by X.Y. Huang, M. Stefanov, D.K. Yang, J.W. Doane. SID 96 Digest 359.

"36.3: Unipolar Implementation for the Dynamic Drive Scheme of Bistable Reflective Cholesteric Displays", by X.Y. Huang, N. Miller, J. W. Doane. SID 97 Digest 899.

"Gray Scale Drive Schemes For bistable Cholesteric Reflective Displays", by J. Gandhi and D.K. Yang. Asia Display 98.

"15.4: A Reflective MIM–Addressed PSCT Display Suited for Video Applications", by W. Sautter, R. bunz, R. Harjung, E. Lueder, D.K. Yang, J. W. Doane. Euro Display '96.

"P–82: Cumulative Drive Schemes for Bistable Reflective Cholesteric LCDs", by Y.M. Zhu, D.K. Yang. SID 98 Digest.

"LP–1: Late–News Poster: Gray Scale of Bistable Reflective Cholesteric Displays", by X.Y. Huang, N. Miller, A. Khan, D. Davis, J.W. Doane, D.K. Yang. SID 98 Digest.

"Full Color (4096 Colors) Reflective Cholesteric Liquid Crystal Display", by X.Y. Huang, A. Khan, D. Davis, C. Jones, N. Miller, J.W. Doane. Asia Display 98.

"Amorphous Silicon Thin–Film Transistor Active–Matrix Reflective Cholesteric Liquid Crystal Display", by J.Y. Nahm, T. Goda, B.H. Min, t.K. chou, an dJ. Kanicki, X.Y. Huang, N. Miller, V. Sergan, P. Box, and J.W. Doane. Asia Display 98.

"Unipolar Waveform Drive Method and Apparatus For a bistable Liquid Crystal Display", application No. 09/063, 907, Apr. 21, 1998.

"A High Reflective LCD with Double Cholesteric Liquid Crystal Layers", by Y. Kawata, H. Yamaguchi, T. Yamaguchi, T. Oka, M. Mori, H. Kobayashi, N. Kamiura, T. Hioki, K. Taira, H. Okumura, M. Akiyama and K. Suzuki.

U.S. Appl. No. 09/836,640, Huang et al., filed Apr. 18, 2001.

U.S. Appl. No. 09/836,319, Huang et al., filed Apr. 18, 2001.

George L. Heilmeier and Joel E. Goldmacher, "A New Electric–Field Controlled Reflective Optical Storage Effect in Mixed –Liquid Crystal Systems", Applied Physics Letters, vol. 13, No. 4, pp. 132–133.

* cited by examiner

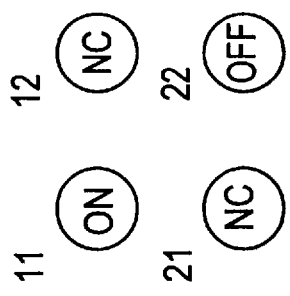
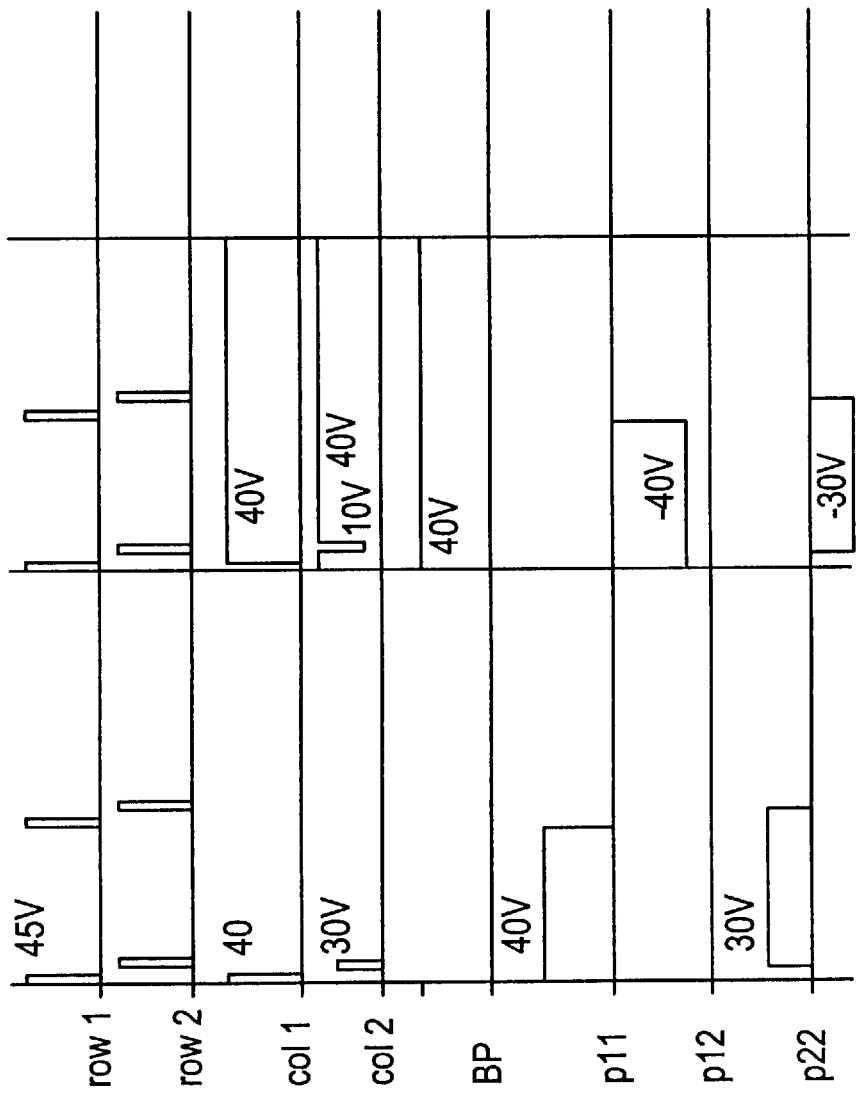
FIG. 5a
FIG. 5b

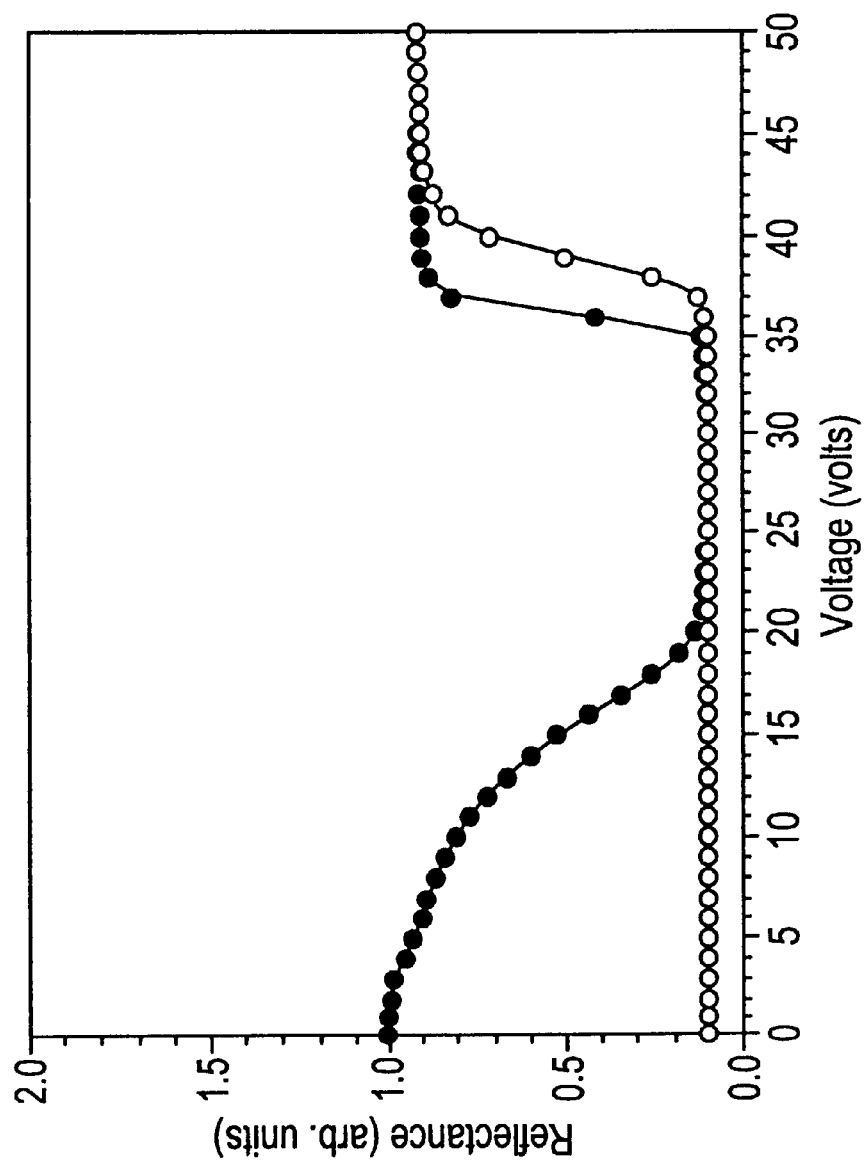

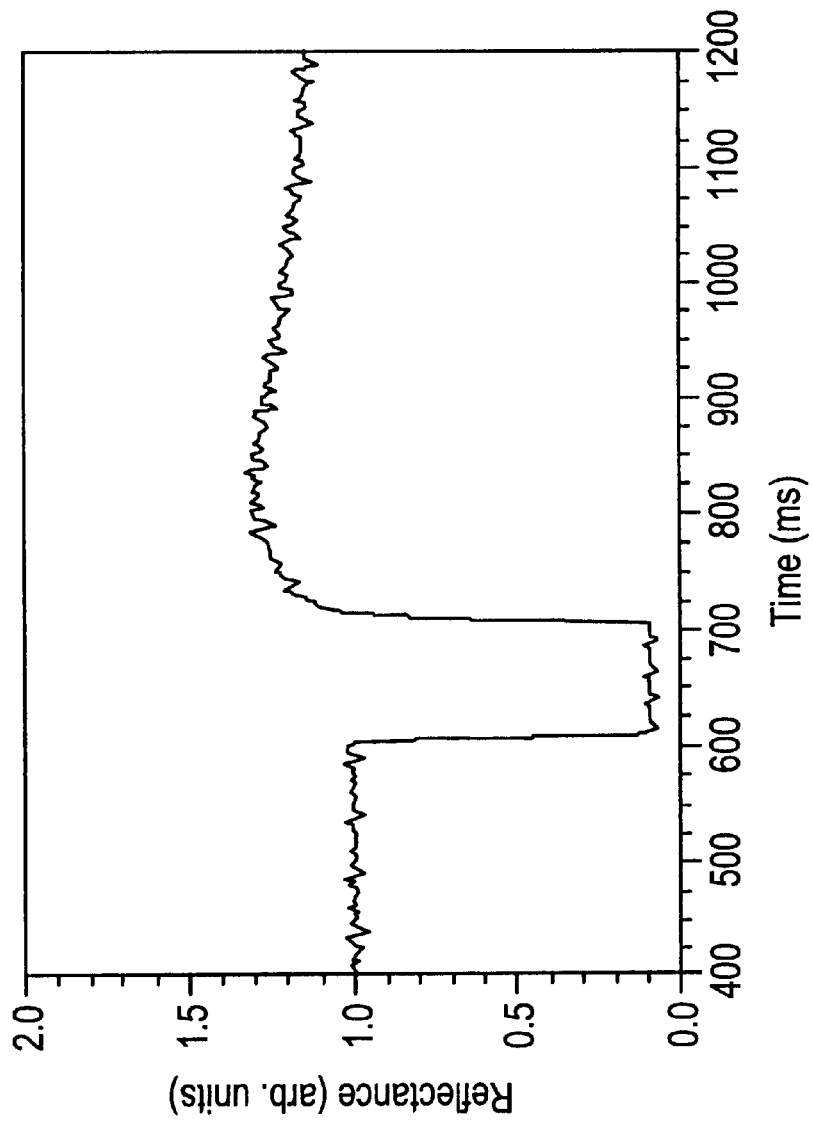

OPERATING METHOD FOR ACTIVE MATRIX ADDRESSED BISTABLE REFLECTIVE CHOLESTERIC DISPLAYS

The present application claims priority from previously filed Provisional Patent Application Ser. No. 60/200,001, which was filed on Apr. 27, 2000. The Provisional Patent Application is incorporated herein, in its entirety, by reference.

BACKGROUND OF THE INVENTION

The present invention relates generally to bistable, reflective Cholesteric displays. More specifically, the present invention relates to an operating method for active matrix addressed bistable, reflective Cholesteric displays. Advantageously, a corresponding system including a bistable, reflective Cholesteric display and a graphic controller for driving the bistable, reflective Cholesteric display are also disclosed.

Liquid crystal displays (LCD's) have been widely adapted for use in a number of products such as digital watches and clocks, laptop computers, and information and advertising display signs. LCD's are generally classified according to their drive scheme, e.g., passive matrix LCD's and active matrix LCD's.

With respect to passive matrix LCD's, the display includes a thin layer of liquid crystal material sandwiched between two transparent panels. An electrode array comprising a first set or plurality of parallel oriented electrode segments (row electrode segments) disposed on an inwardly facing side of one panel and a second set or plurality of parallel oriented electrode segments (column electrode segments) which are perpendicular to the row electrode segments disposed on an inwardly facing side of the other panel is provided. The row and column electrode segments are spaced apart by spacer material and the liquid crystal material is filled in the spaced apart region between the panels.

Display picture elements or pixels are defined by regions of liquid crystal material adjacent the intersections of aligned electrodes of the horizontal and vertical electrode segments of the electrode array. Upon application of a suitable electric field, a pixel in a reflective display will assume either a reflective or a non-reflective state. A pixel, pi,j, formed at the overlapping or intersection of the ith row electrode and the jth column electrode is subject to an electric field resulting from the potential difference between a voltage applied to the ith row electrode segment and a voltage applied to the jth column electrode segment.

Recent advances in liquid crystal material research have resulted in the discovery of bistable chiral nematic (also called cholesteric) liquid crystal materials. Cholesteric liquid crystal materials are able to maintain a given state (reflective or non-reflective) without the need for the constant application of an electric field. When data or an image displayed on a display is to be changed, the display driver circuitry will update the display corresponding to the changes.

If the panel furthest from the viewer is painted with a black substrate, a pixel with a low reflectance will appear as a black area to the viewer. If the liquid crystal material has a light color appearance (such as yellow) in its highly reflective state, a pixel in a high reflectance state will appear to the viewer as an iridescent colored area on a black background.

Bistable Cholesteric liquid crystal displays (hereinafter Ch-LCD) have received considerable attention of display designers and manufacturers in recent years for portable applications because of their advantageous optical properties and low power consumption. It will be appreciated that this interest has resulted in the introduction of a significant number of products employed in a wide variety of applications. Moreover, this interest has produced various improvements in bistable, reflective Cholesteric displays in terms of optical properties such as brightness, contrast, and full color.

The most prevalent technique for driving the Ch-LCD is by passive matrix addressing. In that case, display driver circuitry is coupled to the vertical and horizontal electrodes of the electrode array. Operating under the control of a logic and control unit, the display driver circuitry energizes the row and column electrodes with appropriate voltage waveforms such that an appropriate voltage across each pixel is generated. The voltage across a pixel will either cause it to remain in its present state of reflectance or change its state of reflectance. The image generated by the display pixels may be modified by changing the state of selected pixels. In this way, text or image data can be presented for viewing.

In the invention disclosed in U.S. Pat. No. 5,748,277 (the '277 patent), which is entitled "Dynamic Drive Method and Apparatus for a Bistable Liquid Crystal Display," a method and display driver circuitry for speeding the rate of updating a 1,000 row cholesteric liquid crystal display was disclosed. The '277 patent is incorporated herein in its entirety by reference. An updating time of approximately one second for a 1000 row display was achieved. By simultaneously addressing multiple rows of the display with a pipelining scheme, the overall updating time for the display was kept at one second.

With suitable thresholds, zero voltage bistability enables low cost passive matrix addressing for Ch-LCD. However, the slow material response time and the unique switching scheme required by the bistable display makes it difficult for a Ch-LCD to achieve video rate updates on a large format display. While a significant amount of effort has also been devoted to improving the update speed (in milliseconds (ms)) of the bistable, reflective Cholesteric displays, results to date have been less than optimal, as discussed in greater detail immediately below.

The dynamic and electro-optical responses of a typical, bistable reflective Ch-LCD are illustrated in FIGS. 1A and 1B. As shown in FIG. 1a, an AC voltage in the form of pulses varying from 0V to 50V is applied to the display and the reflectance is plotted; in FIG. 1b, reflectance is plotted as a function of time.

Referring to FIG. 1a, the reflectance is initially high, i.e., before any voltage is applied. Upon the application of the voltage pulse, the display is switched into the Homeotropic State and the reflectance becomes very low. Once the voltage pulse is switched off, the reflectance gradually increases to the maximum. The rise time of the display is about 250 ms, as illustrated in FIG. 1b. It will be appreciated that in video applications, this long rise time will cause unpleasant image ghosting.

It will be noted that the final display reflectance versus the voltage amplitude is shown in FIG. 1a. More specifically, there are two initial (stable) states: the planar (higher reflectance) state and the focal conic (lower reflectance) state. It will also be noted that there are several threshold voltages. When the applied voltage is below V1, the display will stay in either of its initial states after the pulse. When the voltage increases from V1 to V2, the reflectance of the initially ON display will decrease to a minimal value. The reflectance of the initially OFF display begins to increase when the voltage is above V3' and the reflectance reaches the maximum when the voltage is above V4. The reflectance of the initially ON display begins to increase its reflectance when the voltage is above V3 and the reflectance reaches the maximum when the voltage is above V4'. Therefore, for voltage between V2 and V3, the display is switched to the low Reflectance State regardless of its initial state; for voltage above V4, the display is switched to the high reflective state regardless of its initial state. Note that there are regions in the voltage response diagram, such as between V1 and V2, where there exists stable partially reflecting states providing the opportunity for gray scale addressing.

Basic concepts and schemes for passive matrix addressing of a bistable reflective cholesteric display are disclosed in U.S. Pat. No. 5,251,048 and U.S. Pat. No. 5,644,330, which patents are incorporated herein by reference. A basic requirement for passive matrix addressing is that:

$$[(V4-V3)/2] > V1.$$

This requirement can be met by adjusting the display process and associated material parameters. However, this requirement also limits the adaptation of certain display configurations, which configurations may have other benefits.

Several drive methods have been developed in an effort to improve the speed at which the cells of a bistable, reflective Cholesteric display can be changed between the ON and OFF states. For example, specialized drive schemes and erase sequences can be employed to improve the speed of a conventional drive system to approximately 3 ms/row, as described in U.S. Pat. No. 5,644,330. In contrast, dynamic driving of the bistable, reflective Cholesteric display makes use of the fast homeotropic-transient planar transition, which results in a drive speed of approximately 0.5 ms/row. The dynamic driving technique is described in greater detail U.S. Pat. No. 5,748,277 and in the paper by X. Y. Huang et al. in the SID '95 Technical Digest, p. 347 (1995).

It should be noted that, due to the use of a passive matrix addressing scheme, the user always sees a black scan line sweeping across the entire screen. The development of a cumulative drive scheme removes the black scan line; however, it is limited by how many rows that can be addressed in one frame period. Additional details regarding the cumulative drive are disclosed in U.S. Pat. No. 6,133,895, which patent is incorporated herein be reference in its entirety for all purposes. All of these limitations are inherent in the passive matrix addressing methods used in addressing and driving bistable, reflective Cholesteric displays.

An active matrix addressing method for bistable, reflective Cholesteric displays has been proposed which makes use of the planar and the homeotropic states. Further details regarding this proposed method are available in the article by J. Y. Nahm et al. presented in the proceedings of at Asia Display '98 (18$^{th}$ International Display Research Conference, Seoul, Korea), p. 979 (1998), and by Y. Kawata et. al. in Proceedings Of The International Research Conference 97 (Toronto, Canada), p. 246 (1997). However, in that addressing scheme, the bistability of the Cholesteric display was sacrificed, which, in turn, resulted in an increase in the power required to drive the active matrix Cholesteric displays. Furthermore, it will be noted that it is not possible to provide a gray scale using the previously proposed active matrix addressing method.

Before discussing the present invention in greater detail, it should be mentioned that all of the patents and articles cited within the instant specification are incorporated herein by reference.

What is needed is a drive method and corresponding circuitry for an active matrix addressed bistable, reflective Cholesteric display which avoids the relatively low update speed limitation associated with such displays. Moreover, what is needed is a drive method and corresponding circuitry for an active matrix addressed bistable, reflective Cholesteric display which maintains the low power benefit of Cholesteric display technology. What is also need is a combination including an active matrix addressed bistable, reflective Cholesteric display and associated drive circuitry. It would be beneficial if the combination could be included into a plurality of different products.

SUMMARY OF THE INVENTION

Based on the above and foregoing, it can be appreciated that there presently exists a need in the art an operating method for an active matrix addressed bistable, reflective Cholesteric display which overcomes the above-described deficiencies. The present invention was motivated by a desire to overcome the drawbacks and shortcomings of the presently available technology, and thereby fulfill this need in the art.

According to one aspect of the present invention, an active matrix addressed Cholesteric display is achieved by careful design of the drive scheme, implemented via the driver and controller, to thereby allow the Cholesteric display to maintain its superior optical performance, e.g., high brightness, high contrast, flicker-free viewing, and the low power bistability, i.e., only the pixels that need to be changed are updated. The improved active matrix addressed bistable, reflective Cholesteric display according to the present invention advantageously provides a video rate compatible, scan-line free update capability.

In one aspect, the present invention provides an operating method for a color display system including an active matrix bistable liquid crystal display (LCD) having a plurality of pixels arranged in a matrix based on color data and status bits corresponding to each of the pixels stored in a memory. Preferably, the method includes steps for generating voltage data corresponding to the pixels based on the color data and the status bits stored for each of the pixels, converting the voltage data to drive signals suitable for driving the active matrix bistable LCD, and applying the drive signals to the active matrix bistable LCD. In an exemplary embodiment, the active matrix bistable LCD is a Cholesteric LCD. Advantageously, the generating, converting, and applying steps are repeated for a corresponding pixel N times, where N is an integer established by the status bits.

In another aspect, the present invention provides an operating method for a color display system including an active matrix bistable liquid crystal display (LCD) having a plurality of pixels arranged in a matrix. The method beneficially includes steps for storing color data and status bits corresponding to each of the pixels, generating voltage data corresponding to the pixels based on the color data and the status bits stored for each of the pixels, converting the voltage data to drive signals suitable for driving the active matrix bistable LCD, and applying the drive signals to the active matrix bistable LCD. In an exemplary embodiment, the active matrix bistable LCD is a Cholesteric LCD. Advantageously, the generating, converting, and applying steps are repeated for a corresponding pixel N times, where N is an integer established by the status bits.

According to a further aspect, the present invention provides a method for operating a graphics controller including a memory, which stores color data and status bits corresponding to a plurality of pixels, coupled to a low power color display, which includes an active matrix bistable liquid crystal display (LCD) having a plurality of cells arranged in a matrix, each cell corresponding to respective one of the pixels, via driver circuitry, the LCD receiving drive signals suitable for driving the active matrix bistable LCD from the driver circuitry responsive to voltage data. The method includes steps for generating the voltage data for each respective one of the pixels based on the color data and the status bits for that pixel, decrementing the status bits by 1 to thereby produce decremented status bits for that pixel, overwriting the status bits for that pixel with the decremented status bits, and repeating the generating, the decrementing, and the overwriting steps until the status bits stored in the memory for that pixel represent a zero value. In an exemplary embodiment, the method includes a step for setting the status bits to a predetermined value when the corresponding color data for a respective one of the pixels stored in the memory is replaced by new color data.

According to a still further aspect, the present invention provides a method for operating a graphics controller including a memory, which stores color data and status bits corresponding to a plurality of pixels, coupled to a low power color display, which includes an active matrix bistable liquid crystal display (LCD) having a plurality of cells arranged in a matrix, each cell corresponding to respective one of the pixels, via driver circuitry, the LCD receiving drive signals suitable for driving the active matrix bistable LCD from the driver circuitry responsive to voltage data. Preferably, the method includes steps for generating the voltage data for each respective one of the pixels based on the color data and the status bits for each pixel having non-zero status bits, decrementing the status bits by 1 to thereby produce decremented status bits for each pixel having the non-zero status bits, overwriting the status bits with the decremented status bits for each pixel having the non-zero status bits, and repeating the generating, the decrementing, and the overwriting steps until the status bits stored in the memory for all of the pixels represent a zero value. Advantageously, the method can include a step for generating a sleep signal when all of the status bits for all of the pixels represent zero values, where the driver circuitry has on and off states to thereby permit the driver circuitry to be switched from the on state to the off state responsive to the sleep signal. Moreover, the method can include a further step for step of setting the status bits to a predetermined value when corresponding color data for a respective one of the pixels is stored in the memory. It will be appreciated that, since the color data for all of the pixels need not be received during a single period, a first value represented by the status bits corresponding to a first one of the pixels need not be equal to a second value represented by the status bits corresponding to a second one of the pixels. It will also be appreciated that the method advantageously can include a step for examining the status bits stored in the memory. In that case, the examining step is performed either prior to or concurrent with the generating step, and the generating step is modified to permit generating the voltage data for each respective one of the pixels having non-zero status bits based on the color data and the status bits for that pixel.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 5a illustrates the row, column and backplane waveforms corresponding to the pixels illustrated in FIG. 5b;

FIGS. 7a and 7b illustrate the dynamic and electro-optical response of a polymer stabilized finger-print cholesteric texture (PSFPCT) display with respect to variations in applied voltage and relaxation time, respectively; and FIGS. 8a and 8b illustrate the dynamic and electro-optical response of a surface stabilized bistable cholesteric display with respect to variations in applied voltage and relaxation time, respectively.

DETAILED DESCRIPTION OF THE PREFERRED EMBODIMENTS

Figure 1A:
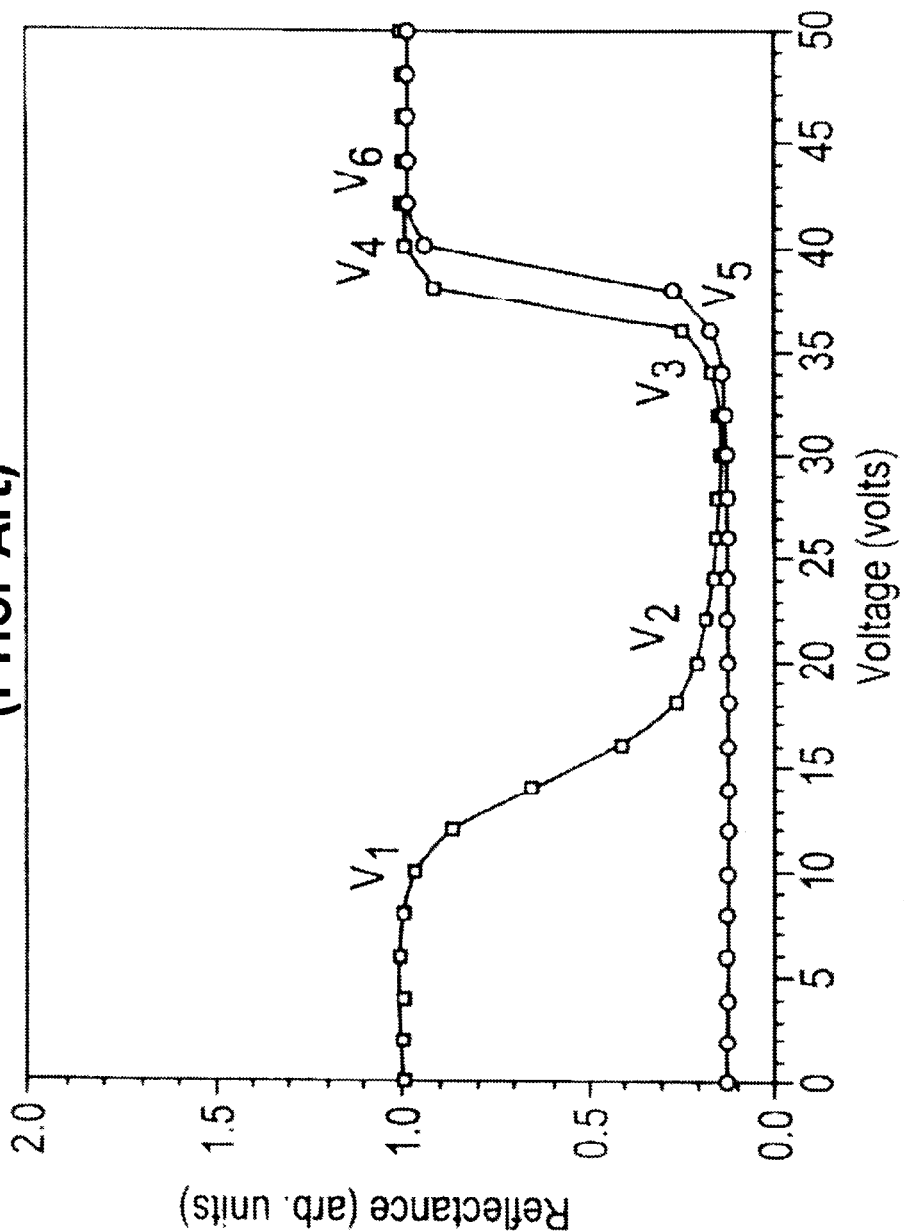
FIGS. 1a and 1b illustrate the dynamic and electro-optical response of a surface stabilized Cholesteric display with respect to variations in applied voltage and relaxation time, respectively.
Figure 1B:
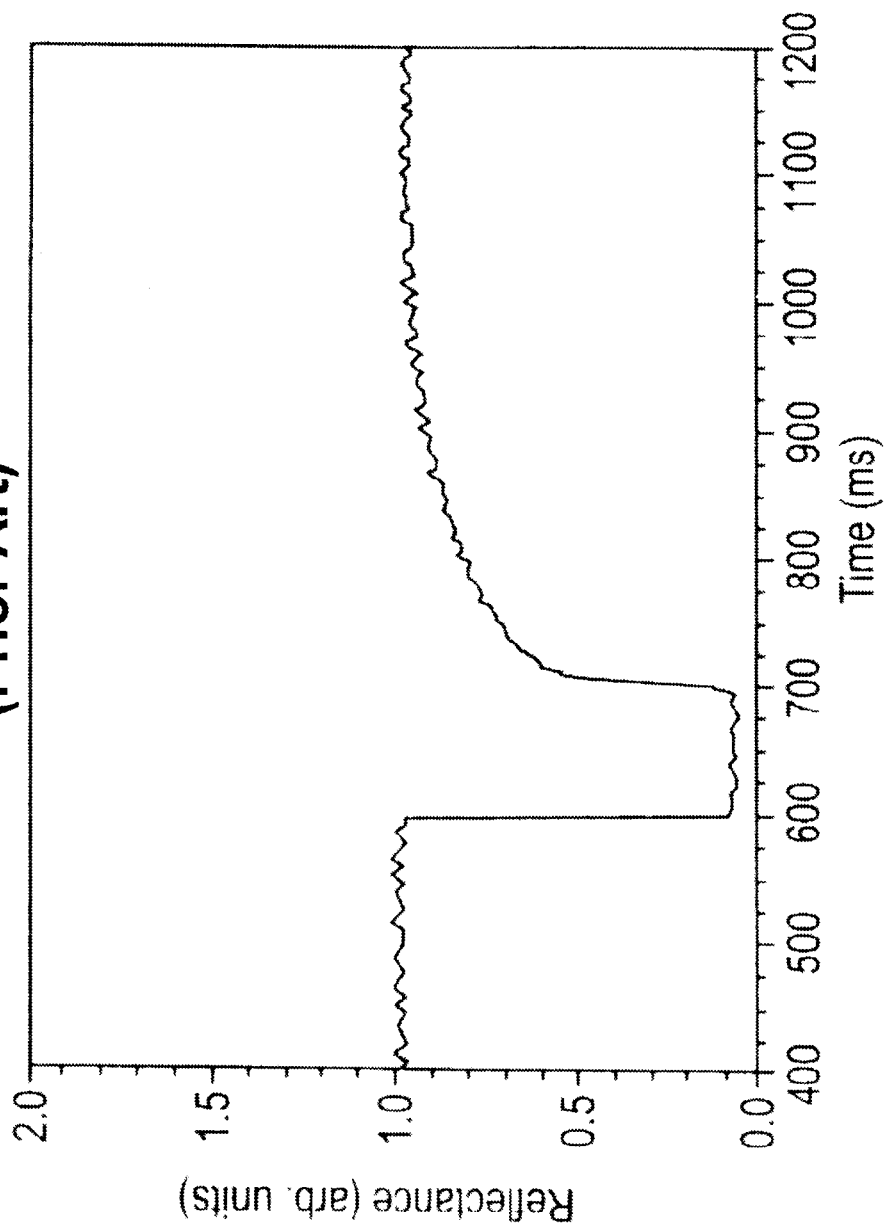

As mentioned above, the present invention provides an active matrix addressed Cholesteric display, e.g., the Ch-LCD. Careful design of the drive scheme, implemented via the driver and controller, permits the Cholesteric display to maintain its superior optical performance, e.g., high brightness, high contrast, flicker-free viewing, and the low power bistability, i.e., only the pixels that need to be changed are updated. Moreover, the improved active matrix addressed bistable, reflective Ch-LCD according to the present invention advantageously provides a video rate compatible, scan-line free update capability.

Before describing the preferred embodiments of the present invention in detail, it should be mentioned that there are two stable states of a bistable reflective Ch-LCD, the planar state and the focal conic state. The planar state exhibits high reflectivity and is commonly referred to as the ON state. The focal conic state has low reflectivity and is, in contrast, referred to as the OFF state. With a black paint on the back of the substrate of the Ch-LCD, the planar state appears in some pre-selected color, e.g., yellow, while the focal conic state appears to be black. The amount of light reflected from the planar state can be adjusted to achieve different shades of a particular reflected color or gray levels. This feature makes possible a full-color display as described in publication "Full color (4096) reflective cholesteric liquid crystal display" by Huang et al. Asia Display '98 Technical Digest, p883. A full-color display is made by stacking three display cells, each of a different primary color, red, green and blue with the black background painted on the back substrate of the bottom cell.

It should be noted that the display could be switched from the planar state to the focal conic state directly by application of a suitable pulse having a proper magnitude as characterized by voltage level and time duration or pulse width. However, the display cannot be switched from the focal conic state to the planar state directly. Instead, a large magnitude pulse is first applied to the cells of the display in the focal conic state to thereby align the liquid crystal in the selected cells to the Homeotropic State, which is then switched OFF quickly. It will be appreciated that the liquid crystal material first relaxes into the transient planar state in about 1 ms, and then more slowly to the planar state. At room temperature, a typical voltage pulse would be about 10 ms in duration, which would permit the Cholesteric liquid crystal to relax into the planar state approximately 100–300 ms after the pulse has been terminated. During this transient time, each effected pixel in the Ch-LCD changes from black to a state with predetermined reflectivity.

In contrast, i.e., in the case of passive matrix addressing, the data voltage difference between the ON and OFF states is limited. Therefore, all the pixels in a row are selected, independent of their previous image state, and the voltage pulse with suitable magnitude is applied according to the desired final state of the pixel, i.e., a relatively low magnitude for the focal conic state and a relatively high magnitude for the planar state. The relatively low magnitude immediately drives each pixel in the row to the focal conic state and the pixel appears black. The relatively high magnitude drives the pixel to the Homeotropic State in which each pixel also appears to be black. Therefore, the whole selected row appears black. It will be appreciated that the maximum drive speed for this one-line-at-a-time drive scheme, i.e., passive matrix addressing, is approximately 5 ms/row. For a large display panel with many rows, e.g., 100 rows, the users can actually see a black line scan down the screen. In the dynamic drive scheme, the average row selection time can be reduced to about 1 ms/row. However, there are many driven rows, e.g., 40 rows, in the active driving pipeline. Thus, the user will still see a black band, the black line is just sweeping down the screen at a faster rate.

It should also be mentioned that the cumulative drive scheme is able to remove the black scan line by scanning the screen, or at least a selected portion of the screen, repetitively at a high refresh rate, i.e., greater than 40 scans/second. Due to image retention characteristic of the human eye, the black scanning line disappears. However, the maximum driver voltage, maximum data voltage and the material response time limits the row selection time to about 2 ms/row, which is equivalent to eight rows at a 60 Hz scanning rate. The limited number of rows that advantageously can be driven while avoiding the characteristic black scan line of Ch-LCD's implies that this passive matrix drive scheme can only be of benefit in a limited number of specific applications. In any event, the cumulative drive scheme's ability to minimize black scan lines down the face of the Ch-LCD also demonstrates that the Cholesteric material advantageously can be operated at speeds approaching that of a conventional video update rate, provide that the proper drive scheme can be applied.

Fundamentally, an active matrix display can be conceptualized as a matrix display in which each pixel of the display advantageously can be switched ON and OFF independently. Examples of active matrix displays are disclosed in U.S. Pat. Nos. 4,042,854, 4,062,626, 4,404,555, and 4,717,244, to name but a few. In a conventional active matrix display without bistability, a voltage is always applied to maintain the pixels at the selected ON or OFF state. To make the best use of the bistability of Ch-LCD, the Ch-LCD according to the present invention implements a three-state drive method for an active matrix display. The three states are:

(1) OFF to ON;
(2) ON to OFF; and
(3) NC (no change).

Figure 2:
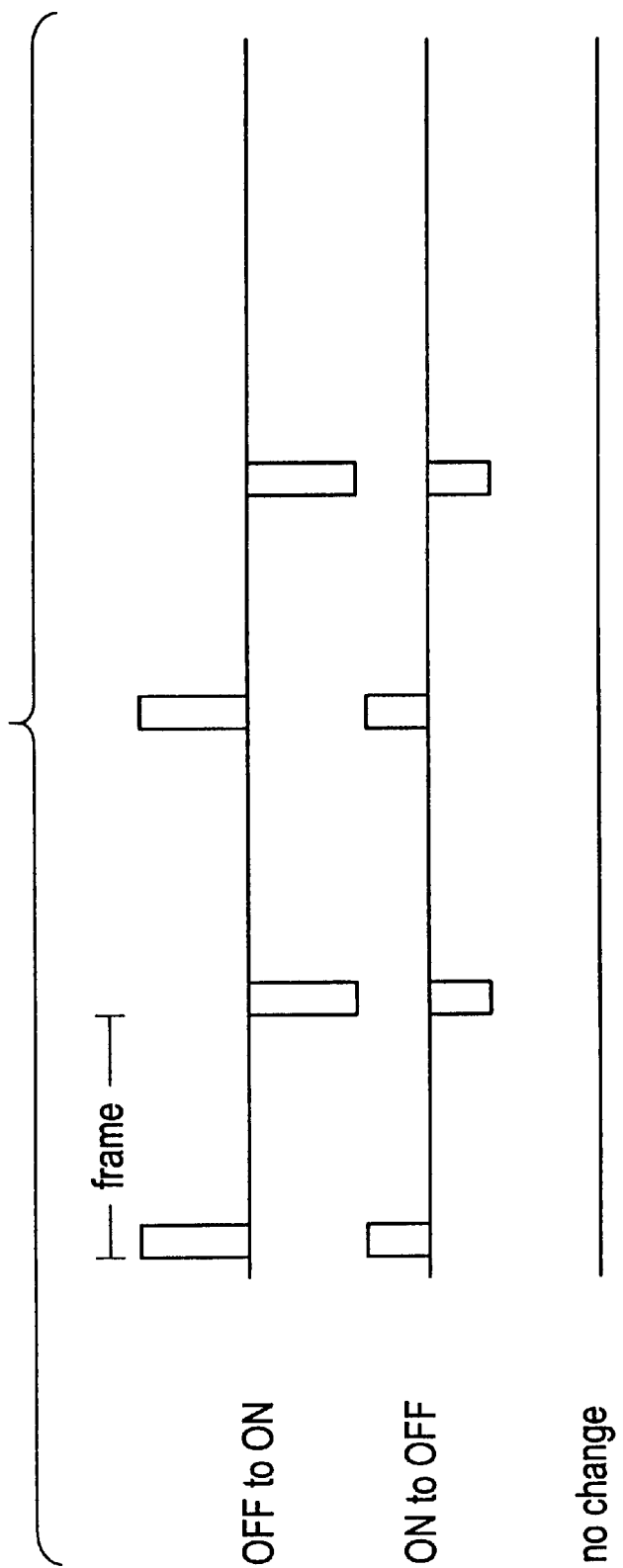
FIG. 2 illustrates the pixel waveforms of the pulses employed in driving the active matrix addressed Cholesteric display between its various states.

When any pixel in the active matrix display is to be switched from the OFF state to the ON state, a high voltage is applied to the selected pixel to thereby effect the change of state. When a pixel or group of pixels in the active matrix display is to be switched from the ON state to the OFF state, a low voltage is applied to thereby cause the desired change of state. Furthermore, when any pixel in the active matrix display is needs to maintain its current state, zero volts are applied to the pixel. The waveform on each pixel is shown in FIG. 2. The characteristics and features associated with these waveforms are discussed immediately below.

1. The high or low pulse is applied repetitively with a time interval depending on the frame rate. If the frame rate is 60 Hz, the interval is 16.7 ms. If the frame rate is 30 Hz, the interval is 33.3 ms.
2. The width and the number of the pulses depend on the material response time. The goal is for the pixels that need to be switched from OFF to ON, during the last pulse the whole pixel should be switched to the homeotropic state; for the pixels that need to be switched from ON to OFF, during the last pulse, the whole pixel should be switched to the focal conic state.
3. The pixel voltages are turned OFF at the end of each frame to reduce the operation voltage of driver cost in the frame inversion scheme.
4. The voltage difference between the ON and OFF waveform is not as limited as that of the passive matrix drive.
5. The cumulative effect of the display is also used so that the pixel can be completely switched in several frames. However, once the destination state is achieved, the voltage applied to the pixel is zero. This can significantly reduce the power consumption.

It will be appreciated that the use of the active matrix enables the whole display to be updated almost at the same time. However, it will also be appreciated that the pixel voltage level is changed inside a frame time. Therefore, modifications in the drive control circuitry are needed.

It will be noted that there are two states in the row driver, i.e., select and non-select, for an active matrix display. Thus, the row data only needs to be 1 bit. In contrast, in order to implement the three state drive scheme according to the present invention, the column drive needs to have three states: ON, OFF, and NC (no change). For that reason, the column driver requires two data bits in order to select between the three states. Thus, the column driver advantageously receives both pixel image data and pixel status data. An exemplary image array block representing storage of these data bits is shown in FIG. 3.

Figure 3:
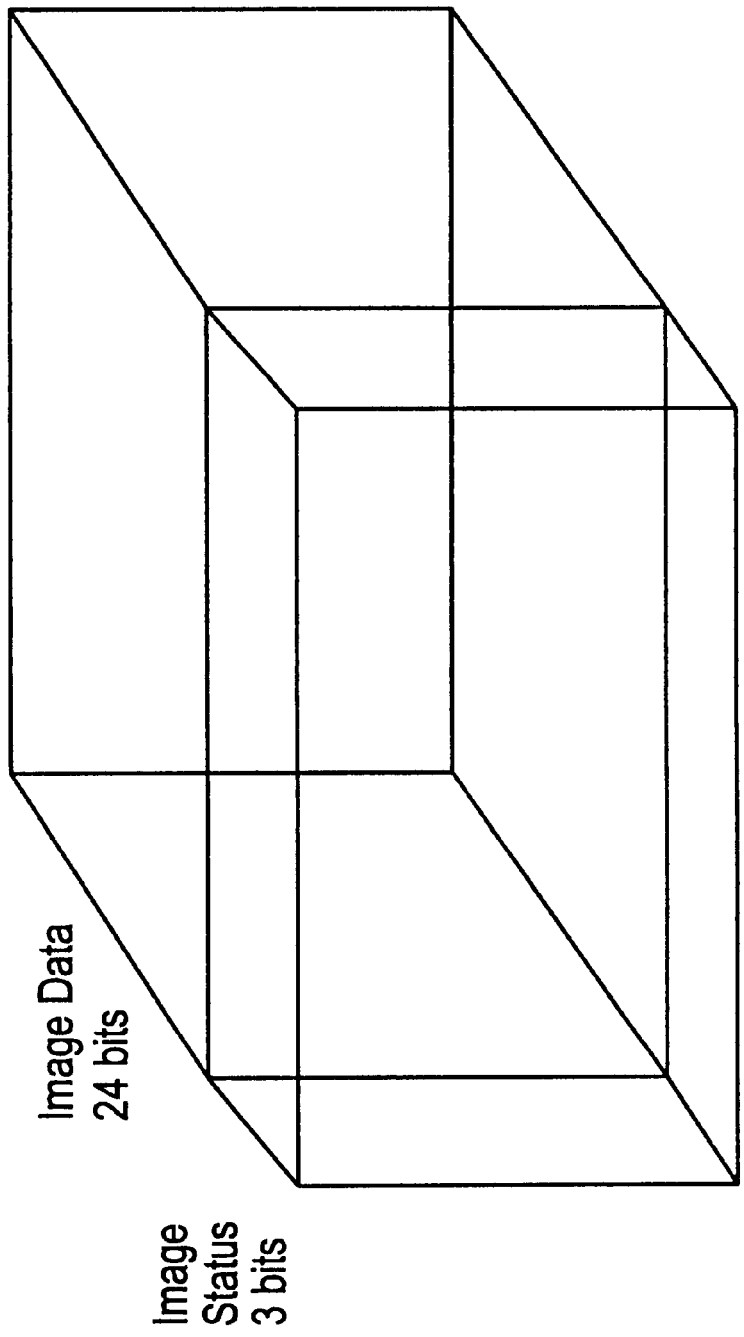
FIG. 3 is a representational diagram illustrating the storage of both status and image data in a single frame buffer.

Referring specifically to the exemplary data organization illustrated in FIG. 3, it will be appreciated that the frame buffer data includes both 24 bits of image data, permitting display in excess of one million colors in the resultant image, and 3 bits of status data. It will be appreciated that colors are represent by three groups each having 8 bits representing 256 gray levels for each color, which requirement dictates that the column driver are amplitude modulated. In addition, the 3 bits of status data allow as many as 8 frames to update an image. In other words, for every frame advance the status bits are decrement by 1 bit; once the status bits are cleared, NC state is assumed and no further updates occur to the pixel. Moreover, once the pixel has been changed, all status bits are set to 1's.

It should be mentioned that the number of status bit and color bits described above relate to only one exemplary embodiment according to the present invention; other combinations of status and color bits are considered to within the scope of the present invention. For example, four status bits and sixteen bits, advantageously could be used. Morever, the four status bit, twelve color bit configuration illustrated in FIG. 6 beneficially can be employed in particular applications.

It will be appreciated that, with the help of the three status bits, more complicated drive sequences can be implemented. For example, the status bits advantageously can be employed in connection with erase cycles to enhance the contrast and the gray scale accuracy.

Figure 4:
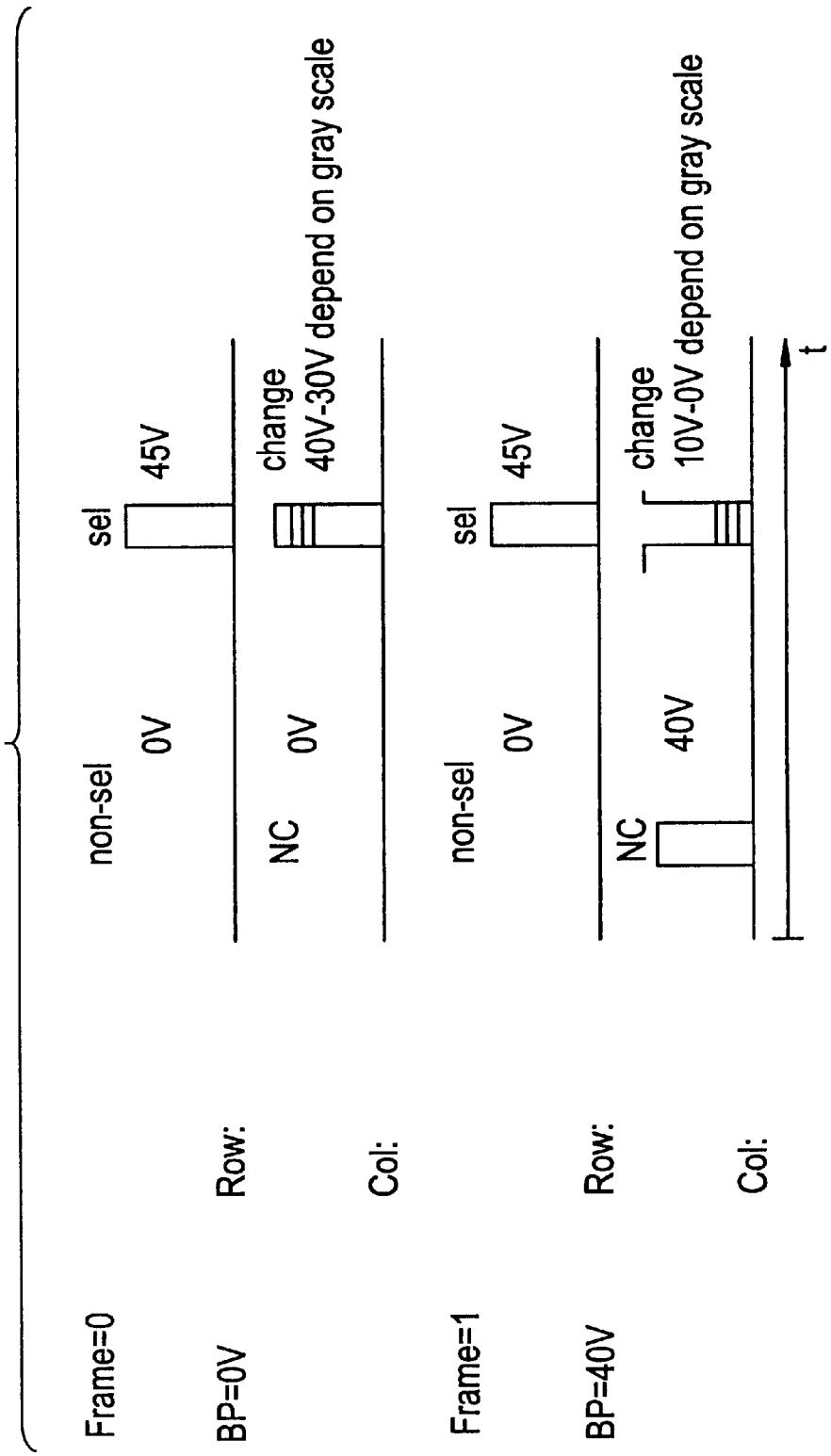
FIG. 4 illustrates the row, column, and back plane (BP) voltage combination employed by the method according to the present invention.

FIG. 4 shows the row, column and back plane (BP) voltage combination, assuming 40V for ON and 30V for OFF, provided by the drive circuitry according to the present invention, which drive circuitry will be discussed in greater detail below. It will be appreciated that in all cases, the row voltage for selection is preferably about 5 V and, most preferably, at least 5V higher than column voltage.

In order to change the voltage level inside one frame, the row, column and backplane voltages need to be arranged as shown in FIG. 5a to drive the pixel pattern illustrated in FIG. 5b. Referring to FIG. 5b, pixel 11 is switched from OFF to ON and Pixel 22 is switched from ON to OFF. Pixel 12 and Pixel 21 are maintained in their previous state, i.e., no change.

It should be mentioned that, during one frame, each row is selected twice. More specifically, the first selection, i.e., pulse, advantageously can be employed to charge the pixel according to the image data and pixel status while the second selection is used to discharge the pixel to zero voltage with respect to the back plane voltage. Therefore, the column voltage during the first selection should reflect the pixel image data and pixel status, and the column voltage during the second selection should be set as NC (no change) so as to discharge the pixel.

It will be appreciated that the time difference between the two selection pulses defines the pulse width. Typically, the pulse width should be kept as short as possible so that the Cholesteric material can have time to relax to the desired state.

One preferred embodiment of the drive circuitry according to the present invention will now be described in detail with reference to FIG. 6. However, before the discussion of the embodiment is presented, it would be helpful to provide some additional general discussion. In particular, it should be mentioned that combining an active matrix-addressing scheme with a bistable reflective Cholesteric liquid crystal display (Ch-LCD) could significantly improve the response speed of the display. Moreover, active matrix addressing of the Ch-LCD advantageously maintains the lower power advantage offered by its bistability and reflective viewing characteristic of the Ch-LCD. It should also be mentioned that the controller design is predicated on the concept that, unlike existing active matrix displays, the drive circuitry for the active matrix Ch-LCD can be completely shut down when the image does not need to be changed. It will be appreciated that the power consumption of the active matrix Ch-LCD is extremely low with respect to other LCD's currently available in the market.

Figure 6:
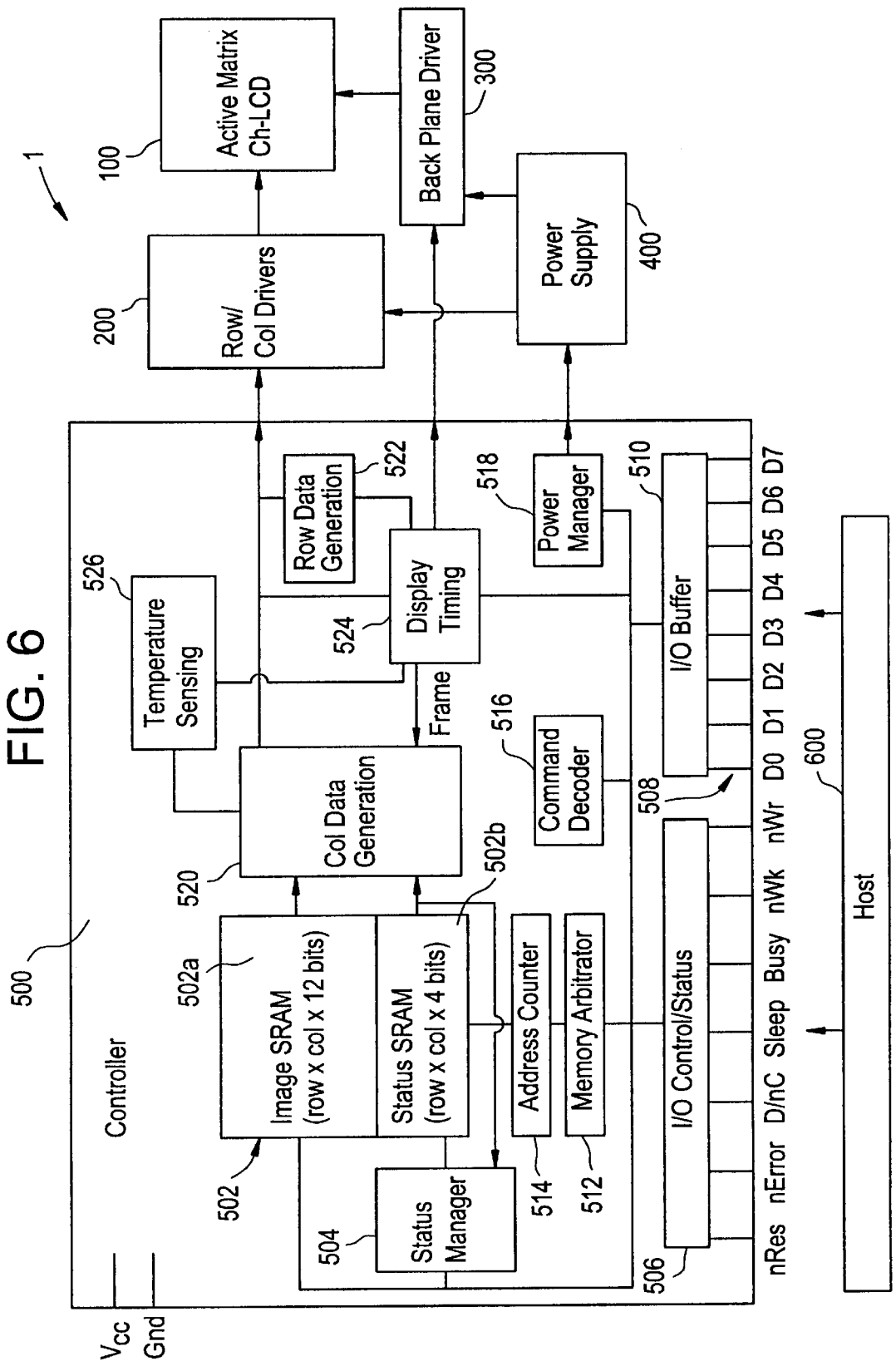
FIG. 6 illustrates circuitry employed in driving the active matrix addressed Cholesteric display according to the present invention.

FIG. 6 is a high-level block diagram of an active matrix Ch-LCD system 1 according to the present invention. The display system 1 includes an active matrix Ch-LCD 100, row (gate) and column (data) drivers 200, a back plane driver 300, a power supply 400 for the above-mentioned drivers, and the controller 500. The controller 500 receives both commands and image data from a processor 600, which processor will be discussed in greater detail below. It should be mentioned that the power supply 400 powering the drivers 200, 300 is controlled by the controller 500 for the efficient power management. As previously discussed, during a wake up operation, the power supplied to the drivers 200, 300 by the power supply 400 is active; during the sleep mode, the power provided to the drivers 200, 300 is removed completely.

An exemplary embodiment of the controller 500 according to the present invention includes a memory 502, which advantageously can be partitioned into image memory 502a and status memory 502b. Preferably, the memory 502 is a static random access memory; alternatively, other types of non-volatile memory, e.g., ferromagnetic random access memory (FRAM), advantageously can be employed. It will be appreciated that a non-volatile memory is preferred, since this type of memory complements the low power characteristic of the Ch-LCD 100. The controller 500 includes a status manager 504, which receives commands via the control/status input/output (I/O) port 506 and which receives data via the data I/O port 508 and a buffer 510. Preferably, buffer 510 facilitates the writing of data into memory 502a under control of a memory arbiter 512 driving address counter 514. The commands received via I/O port 506 are also applied to command decoder 516. In addition, the controller includes a power manager 518, which commands the startup and/or shutdown of the power supply 400. In the controller 500, the image data is read out of memory 502 by column data generator 520 and row data generator 522 in accordance with timing signals produced by the display timing circuit 524. Moreover, the display timing is influenced by the temperature of the display 100, as discussed in greater detail below.

The preferred embodiment of the controller 500 advantageously can be constructed from several ICs, such as an SRAM, an Altera programmable logic, and a National Semiconductor COP8, a power supply chip set, and some other discrete components. However, it will be appreciated that FIG. 6 is a functional block diagram, i.e., FIG. 6 illustrates functions, not discrete components, which functions are discussed in greater detail below. A detailed description of each of these functions is provided below.

In the exemplary embodiment, the Power Manager (function block) 518 advantageously oversees the power supply to the active matrix Ch LCD system 1.A "wake up" generated by the host 600 will toggle at least the controller 500 of the active matrix Ch-LCD system 1 into the high power awake mode. As noted above, the signal from the Status Manager 504 (discussed below) can determine whether to continue operation in the power consuming awake mode or to power down to the power conserving sleep mode. It will be appreciated that there will be a predetermined amount of delay between the time that the status manager 504 signals the power manager to enter the sleep mode of operation and the time that the system 1 actually powers down, thereby preventing cycling been the sleep and awake modes of operation when the host 600 issues a sequence of widely spaced commands or data, e.g., a hunt and peck typist enters a data string with relatively long pauses between characters.

The I/O port 506 permits receipt of commands from the host 600 to the controller 500. In addition, the status if the controller, i.e., Sleep mode, Busy mode, and Awake mode, advantageously can be sensed by the host 600 via this port This is the I/O control logic and the controller status port The controller status can be detected by the host from this port. In control the I/O port 508 and buffer 510 receives and buffers the data or commands provided on lines D0~D7 from the host 600.

In controller 500, the command decoder 516, which advantageously could be a section of logic in a larger logic device, decodes commands received from the host 600, which commands control the overall operation of the active matrix Ch-LCD system 1, e.g., brightness control, frame rate adjustment, image SRAM allocation, etc. In contrast, the display timing circuit 524, which again may be a section of a larger device, provides all necessary timing signals for controller 500 and display 100 operation, e.g., column shift clock, row shift clock, frame, data latch, SRAM clock, etc. The address counter 514 accesses the SRAM memory 502*a* in response to timing signal from the display timing circuit 524. As will be discussed below, some of the clock frequencies are temperature dependent.

It will be appreciate that access to/from the SRAM memory 502*a* necessitates the presence of a memory arbitrator 512. This section of logic accommodates memory access priority and resolves any possible conflicts between the host 600 and display driver 200, 300 demand for memory 502 access. It will be appreciated that, in any active matrix addressing scheme, display scanning can not be stopped while the host 600 accesses (read from or writes to) memory 502; the host 600 can only access the memory 502 while the drivers 200, 300 are not demanding data.

It will be appreciated from FIG. 6 that the memory 502 advantageously included both an image SRAM 502 a and a status SRAM 502*b*. The image SRAM 502*a* provides the memory required for storing the display image, pixel by pixel. In the exemplary embodiment of system 1, the display 100 displays 16 level of gray scale for each layer in a three-layer full color display. Therefore, each pixel corresponds to 12 data bits. The memory 502*a* advantageously provides a low power standby mode so that the display image can be stored in the lower power sleep mode. Moreover, the status SRAM 502*b* advantageously can be employed to the pixel status information needed for the active matrix-addressing scheme according to the present invention. In the exemplary embodiment, a complete update of a pixel will take 16 frames, which can be represented by 4 data bits. When the host 600 updates a pixel, all of its corresponding status bits preferably are set to all 1's. For every frame in which image data is provided to the active matrix Ch-LCD 100, the status bits are decremented by 1. When all of the status bits reach zero, the controller 500 will determine that the "NC" criteria has been satisfied, and the pixel on the display 100 will not be updated, i.e., the row/column driver 200 will apply zero voltage with respect to the back plane.

The status manager 504 provides logic functions with respect to: setting status bits to 1's in the status SRAM 502*b* when a pixel is changed by the host 600; decrementing the status bits by 1 and storing the decremented status bits back into the status SRAM 502*b* after every frame update; monitoring the status SRAM 502*b* to determine whether there is any pixel in the memory needing to be updated further; and issuing the power down signal to the power manager 518.

As mentioned above, the controller 500 advantageously includes both a column data generator 520 and a row data generator 522. The logic incorporated into the column data generator 520 takes image data, frame, and the status bits and forms the column voltage data which is to be applied to the row/column driver 200. If the status bits are zero, the column voltage should be the same as the back plane voltage. If the status bits are not zero, this logic device, i.e., the column data generator 520, will form the voltage data needed to update each pixel. It will be appreciated that the data generator 520 advantageously can include a lookup table (LUT) or comparable device for using the values stored in memories 520*a*, 502*b* as addresses to predetermined values which are to be output by data generator 520. Thus, the data generator 520 provides the capability to implement more complicated multistage drive schemes by, for example, varying the values stored in the LUT. Likewise, the row data generator 522 permits row voltage data to be generated according to the frame and drive progress of each frame.

It will be appreciated from the brief discussion above, the frequencies of respective ones of the timing signals generated by the display timing circuit 524 are temperature dependent. This is because Ch-LCD's are very sensitive to the temperature, especially in gray scale implementation. In the exemplary embodiment of the present invention illustrated in FIG. 6, it will be appreciated that temperature data derived from the substrate of the controller 500 advantageously can be employed to determine the drive voltage, pulse width, and even updating frequency of the controller 500, providing the display and the controller are in thermal contact and their temperature are very close to one another.

A better understanding of the operation of the controller 500 can be obtained by considering the input/output (I/O) signals applied to or generated by the controller, as listed in TABLE 1 immediately below.

TABLE 1

| | |
|---|---|
| nRes | Hardware reset. nRes=0 to reset the complete controller to its default state. |
| nError | Indicates controller error when nError=0 |
| D/nC | Indicates the D0~D7 is data or command from host. D/nC=1: data D/nC=0: command |
| Sleep | Indicates the controller power status Sleep=1: low power sleep mode Sleep=0: high power awake mode |
| Busy | Indicates the controller process status Busy=1: controller is processing last command Busy=0: controller is ready for next command |
| nWk | Host wake up signal. Falling edge wakes up the controller. nWk=0: controller needs to stay awake nWk=1: controller can go to sleep once finished its current task |
| nWr | Write pulse. Falling edge to latch D0~D7 |
| D0~D7 | Image data or command |
| Vcc | 5V power supply |
| Gnd | Power ground |

The essential functionality provided by the controller 500 illustrated in FIG. 6 is summarized immediately below.

1. When the image on the display does not need to be updated, the controller 500 advantageously can be in the Sleep Mode.
2. Minimal power is drained in maintaining the image data in the SRAM 502*a* and in monitoring the interface activity, i.e., I/O ports 506 and 508.
3. Once the host (e.g., central processing unit (CPU)) 600 transmits data which needs to be reflected in the display 100, the power manager circuitry 518 advantageously will wake up the controller 500 by driving the nWk line low.
4. After powering up from the Sleep Mode, the controller 500 advantageously can start to respond to commands and accept the new image data from host 600.
5. Immediately after new image data is received, the controller 500 starts to update the display 100.

6. After the update of the display 100 has been completed, i.e., if no more new image data exists, the controller 500 powers down and returns to the Sleep Mode.
7. The controller 600 will stay in the Sleep Mode until the host 600, e.g., a computer, again wakes up the controller, i.e., until the host computer applies a predetermined "wake up" signal to the controller.

It should be mentioned here that during the display update period, the drive voltage is only applied to those pixels that need to be changed. No voltage is needed to maintain the respective pixel in its previous state. It should also be mentioned that this drive-when-change method advantageously can be employed to dramatically reduce display power consumption.

As discussed above in connection with FIG. 3, the drive-when-changed operating method of the controller requires status bits associated with every displayed pixel in addition to the data corresponding to that pixel. In addition, the controller must employ "Status Manager" logic to direct the controller with respect to the employment of the status bits. Preferably, the number of status bits is determined in accordance with the number of frames that are needed to update each displayed pixel. For example, 3 bits indicates that $8=2^3$ frames are employed in updating a pixel while 4 bits indicates that $16=2^4$ frames are employed. In an exemplary case, when a pixel is change in image memory, i.e, image SRAM, 502a, that pixel's related status bits are all set to a predetermined value, e.g., all 1's, by the status manager 504. For each frame in which the pixel is driven, the status bits in decremented by 1 and written back to the status SRAM 502b. Once the status bits corresponding to a particular pixel in the image data are counted down to zero, the related pixel will not be driven any more, i.e., zero voltage will be applied to that pixel with respect to the back plane. It will be appreciated that the status manager 504 advantageously can monitor whether or not any particular pixel needs to be updated, i.e., the status manager 504 simply checks to determine if there are any non-zero status bits after each frame has been updated. If there is no pixel requiring an update, the status manager 504 informs the power manager 518 of the controller 500, which power manager cycles controller 500 into the Sleep mode of operation.

As mentioned above, the three state active matrix drive scheme or method can significantly improve the update speed of Ch-LCD while maintaining the bistability for low power operation. This drive method can be also extended to full color gray scale application. With the removal of cross talk voltage afforded by the active matrix driving scheme, the power consumption advantageously can be even lower than the passive matrix display in the page update mode.

Moreover, from the discussion provided above, it will be appreciated that the operating characteristic of the Ch-LCD 100 advantageously can be tailored to permit operation of the Ch-LCD 100 with a reduced V1 threshold. Advantageously, in order to achieve a rapid response speed, the display 100 can be a Polymer stabilized finger-print cholesteric texture (PSFPCT) display or a Ch-LCD having a strong homeotropic alignment layer with a lower V1 threshold of the display.

It should be mentioned that a polymer stabilized finger-print cholesteric texture (PSFPCT) display was disclosed in U.S. Pat. No. 5,570,216 and described in a paper entitled "Bistable Reflective Cholesteric Liquid Crystal Display" (J. Appl. Phys. 81(3), (Feb. 1, 1997)), by Min-Hua Lu. This display can be fabricated mixing a predetermined percentage of monomer with the cholesteric liquid crystal mixture. After vacuum filling the display, the display is heated to the isotropic state, and is then slowly cooled down to the room temperature. In this manner, a large domain focal conic fan texture is formed during the cooling with the assistance of a side chain polyimide alignment layer. UV curing is facilitated without any external electric field.

Figure 7B:
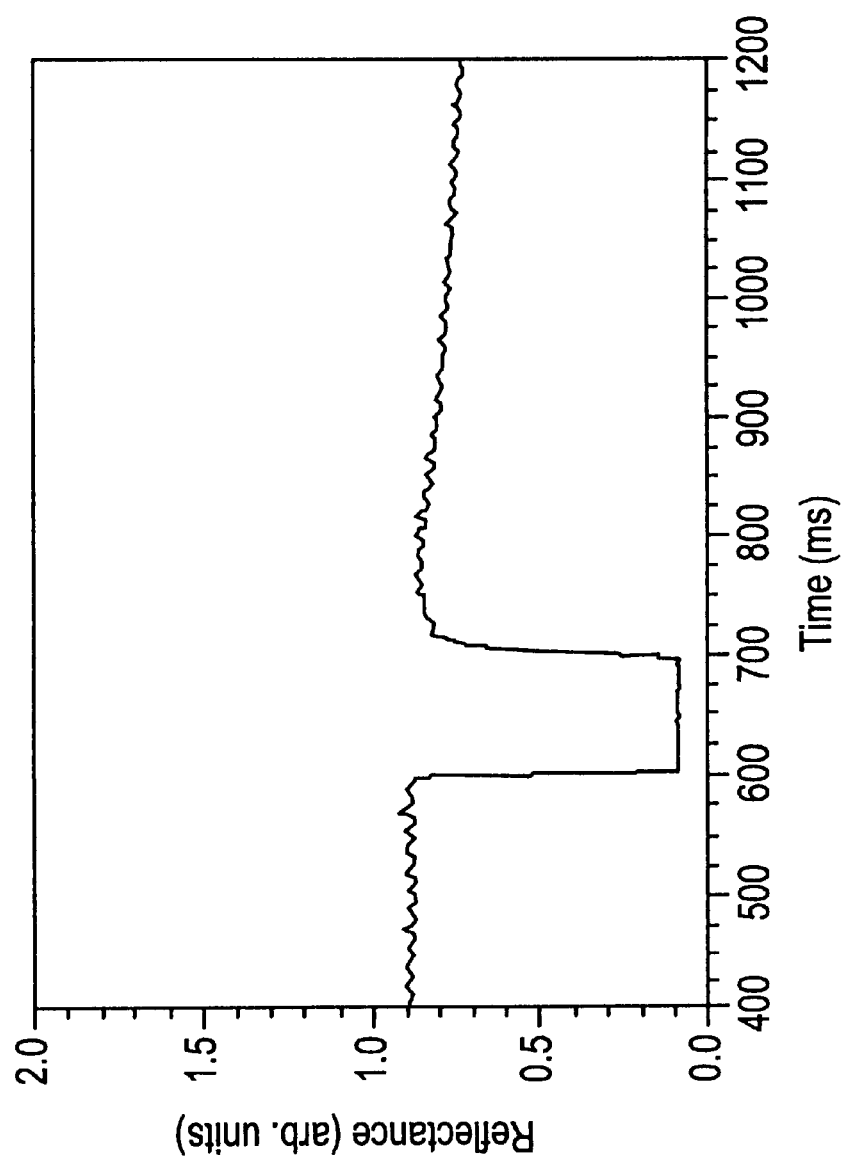

The polymer networks are locked into the large domain fan texture. With proper polymer selection and concentration, the display exhibits fast homeotropic to planar transition, e.g., on the order of 10 ms. Several test displays fabricated according to the procedure set forth above have been characterized as having a repeatable rise time of approximately 10 ms. FIGS. 7a and 7b illustrate the dynamic response and the switching response, respectively, of a typical PSFPCT cell. It will be noted that this display also has very good black state. It will also be noted that the V1 threshold for this cell is so low that the driving of such a display using a passive matrix drive scheme is not possible.

Figure 8A:
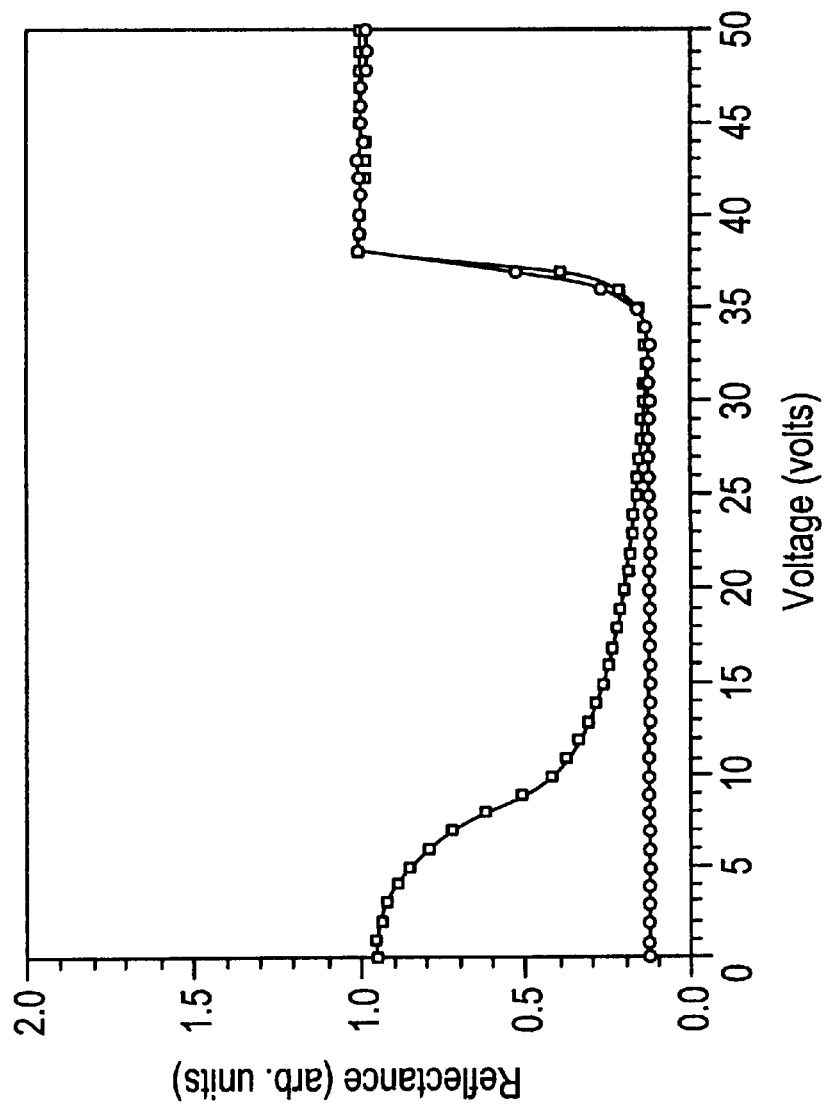

A typical surface stabilized bistable cholesteric display can be made according to method described in U.S. Pat. No. 5,453,863 by Yang and West. However, if the alignment layer has too strong of a homeotropic alignment effect, the display will exhibit a low V1 threshold value, meaning that the device can not be driven by the passive matrix method. Advantageously, this kind of device also exhibits a very fast homeotropic-to-planar (H-P) transition. The dynamic response and the electro-optical response, respectively, are shown in FIGS. 8a and 8b. It will be appreciated from their figures that the rise time in the H-P transition is about 10 ms and the hysteresis between V3 and V3', V4 and V4' is very small. It should be mentioned that the advantage of this device is that it does not require a polymer network. This can significantly simplify the manufacturing process and improve the display reliability.

Application of the active matrix driving method according to the present invention can fundamentally resolve any limitation on the V1 value relative to the ON and OFF voltage values. For example, in a thin film transistor based active matrix display, the drive voltage on the selected rows are not seen by any of the non-selected rows. The state of the non-selected rows is not effected by the driving the pixels in the selected row. This enables the selection of materials, display process parameters, surface treatment, etc., without regard to cell crosstalk. It will be appreciated that the very attractive features of a Ch-LCD with low V1 threshold, while not particularly suitable for existing passive matrix driving methods, provides a display with a fast H-P transition, which satisfies a key requirement for displays employed in video rate applications.

It should be mentioned at this point that the active matrix Ch-LCD system 1 according to the present invention advantageously can be employed as the display of such a devices as personal digital assistants (PDAs), electronic books (e-books), advertising displays, etc. It will also be mentioned that the active matrix Ch-LCD system can be adapted to accept inputs from devices such as desktop and laptop computers, particularly the latter. It will be appreciated that the graphics subsystem of the typical computer generates data sufficient to update the display at 30 or more frames per second. Since much of this data does not vary from frame to frame, providing such repetitive pixel data to the active matrix Ch-LCD system according to the present invention would be counter productive. However, it will be appreciated that the logic provided by the status manager 504 can be augmented with comparison logic. In that case, data provided to the status manager can be compared with the data already stored in image SRAM 502a; only new color data would be written to memory 502a and, consequently, only the status bits corresponding to the new color data would be changed.

It should also be mentioned that the active matrix Ch-LCD system 1 is not limited to the specific embodiments discussed above. For example, when large Ch-LCD's are to be driven according to the present invention, multiple ones of row/column drivers 200 advantageously can be included so that rows 1–50 are driven by row/column driver 200a, rows 51–100 are driven by row/column driver 200b, etc.

Although presently preferred embodiments of the present invention have been described in detail above, it should be clearly understood that many variations and/or modifications of the basic inventive concepts taught herein, which may appear to those skilled in the pertinent art will still fall within the spirit and scope of the present invention. For example, while an exemplary SRAM stores 24 bits of image data and 3 bits of status data per pixel, other memory arrangements advantageously could be employed. Thus, the SRAM could store 12 bits of image data and 4 bits of status data per pixel without departing from the teachings of the present invention.

What is claimed is:

1. An operating method for a color display system including an active matrix bistable cholesteric liquid crystal display (LCD) having a plurality of pixels arranged in a matrix based on color data and status bits corresponding to each of the pixels stored in a memory, comprising:

generating voltage data corresponding to the pixels of the active matrix bistable cholesteric LCD based on the color data and the status bits stored for each of the pixels;

converting the voltage data to drive signals suitable for driving the pixels of the active matrix bistable cholesteric LCD to states of reflectance;

applying the drive signals to the pixels of the active matrix bistable cholesteric LCD effective to place the pixels in one of said reflectance states; and maintaining said liquid crystal material of the pixels in said reflectance states such that all of said reflectance states are stable after removing the drive signals without application of any electric field.

2. The method as recited in claim 1, wherein the generating step is performed when the status bits for the respective one of the pixels correspond to a non-zero binary number.

3. The method as recited in claim 1, wherein the generating, converting, and applying steps are repeated for a corresponding pixel N times, where N is an integer established by the status bits.

4. An operating method for a color display system including an active matrix bistable cholesteric liquid crystal display (LCD) having a plurality of pixels arranged in a matrix, comprising:

storing color data and status bits corresponding to each of the pixels of the active matrix bistable cholesteric LCD;

generating voltage data corresponding to the pixels of the active matrix bistable cholesteric LCD based on the color data and the status bits stored for each of the pixels;

converting the voltage data to drive signals suitable for driving the pixels of the active matrix bistable cholesteric LCD to states of reflectance;

applying the drive signals to the pixels of the active matrix bistable cholesteric LCD effective to place the pixels in one of said reflectance states; and maintaining said liquid crystal material of the pixels in said reflectance states such that all of said reflectance states are stable after removing the drive signals without application of any electric field.

5. The method as recited in claim 4, wherein the generating step is performed when the status bits for the respective one of the pixels correspond to a non-zero binary number.

6. The method as recited in claim 4, wherein the generating, converting, and applying steps are repeated for a corresponding pixel N times, where N is an integer established by the status bits.

7. A method for operating a graphics controller including a memory, which stores color data and status bits corresponding to a plurality of pixels, coupled to a low power color display, which includes an active matrix bistable liquid crystal display (LCD) having a plurality of cells arranged in a matrix, each cell corresponding to respective one of the pixels, via driver circuitry, the LCD receiving drive signals suitable for driving the active matrix bistable LCD from the driver circuitry responsive to voltage data, comprising:

generating the voltage data for each respective one of the pixels based on the color data and the status bits for that pixel;

decrementing the status bits by 1 to thereby produce decremented status bits for that pixel; overwriting the status bits for that pixel with the decremented status bits; and repeating the generating, the decrementing, and the overwriting steps until the status bits stored in the memory for that pixel represent a zero value.

8. The method as recited in claim 7, wherein the LCD comprises a Cholesteric LCD.

9. The method as recited in claim 7, further comprising the step of setting the status bits to a predetermine value when the corresponding color data for a respective one of the pixels stored in the memory is replaced by new color data.

10. A method for operating a graphics controller including a memory, which stores color data and status bits corresponding to a plurality of pixels, coupled to a low power color display, which includes an active matrix bistable liquid crystal display (LCD) having a plurality of cells arranged in a matrix, each cell corresponding to respective one of the pixels, via driver circuitry, the LCD receiving drive signals suitable for driving the active matrix bistable LCD from the driver circuitry responsive to voltage data, comprising:

generating the voltage data for each respective one of the pixels based on the color data and the status bits for each pixel having non-zero status bits;

decrementing the status bits by 1 to thereby produce decremented status bits for each pixel having the non-zero status bits;

overwriting the status bits with the decremented status bit for each pixel having the non-zero status bits; and repeating the generating, the decrementing, and the overwriting steps until the status bits stored in the memory for all of the pixels represent a zero value.

11. The method as recited in claim 10, further comprising:

generating a sleep signal when all of the status bits for all of the pixels represent zero values, wherein:

the driver circuitry has on and off states, and the driver circuitry switches from the on state to the off state responsive to the sleep signal.

12. The method as recited in claim 10, wherein the LCD comprises a Cholesteric LCD.

13. The method as recited in claim 10, further comprising the step of setting the status bits to a predetermined value when corresponding color data for a respective one of the pixels is stored in the memory.

14. The method as recited in claim 10, wherein a first value represented by the status bits corresponding to a first one of the pixels is not equal to second value represented by the status bits corresponding to a second one of the pixels.

15. The method as recited in claim 10, wherein a first value represented by the status bits corresponding to a first one of the pixels is equal to a second value represented by the status bits corresponding to a second one of the pixels.

16. The method as recited in claim 10, wherein: the method further comprises the step of:
examining the status bits stored in the memory, the examining step being performed prior to the generating step; and
the generating step comprises generating the voltage data for each respective one of the pixels having non-zero status bits based on the color data and the status bits for that pixel.

17. The method as recited in claim 10, wherein: the method further comprises the step of:
examining the status bits stored in the memory, the examining step being performed concurrent with the generating step; and
the generating step comprises generating the voltage data for each respective one of the pixels having non-zero status bits based on the color data and the status bits for that pixel.

18. An A method of operating a color active matrix bistable cholesteric liquid crystal display (LCD) comprising the step of:
storing pixel information including color data and status bits;
generating non-zero voltage data corresponding to the pixels of the active matrix bistable cholesteric liquid crystal display based on the color data when the status bits stored for each of the pixels is non-zero;
converting the voltage data to drive signals suitable for driving the pixels of the active matrix bistable cholesteric LCD to states of reflectance;
applying the drive signals to the pixels of the active matrix bistable cholesteric LCD effective to place the pixels in one of said reflectance states; and
maintaining said liquid crystal material of the pixels in said reflectance states such that all of said reflectance states are stable after removing the drive signals without application of any electric field.

19. An operating method for a color active matrix bistable cholesteric liquid crystal (LCD) comprising a plurality of pixels, the method comprising the steps of:
storing color data in memory corresponding to each of the pixels of the active matrix bistable cholesteric LCD;
storing status data different from the color data in the memory, the status data also corresponding to each of the pixels of the active matrix bistable cholesteric LCD;
generating voltage data corresponding to the pixels of the active matrix bistable cholesteric LCD based on the color data and also based on the status data;
converting the voltage data to drive signals suitable for drying the pixels of the active matrix bistable cholesteric LCD to states of reflectance;
applying the drive signals to the pixels of the active matrix bistable cholesteric LCD effective to place the pixels in one of said reflectance states; and
maintaining said liquid crystal material of the pixels in said reflectance states such that all of said reflectance states are stable after removing the drive signals without application of any electric field.

20. The method as recited in claim 19, wherein the generating step is performed when the status data for the respective one of the pixels correspond to a non-zero binary number.

21. The method as recited in claim 20, wherein the generating, converting, and applying steps are repeated for a corresponding pixel N times, where N is an integer established by the status data.

22. An operating method for a color display system including an active matrix bistable cholesteric liquid crystal display (LCD) having a plurality of pixels arranged in a matrix, the method comprising the steps of:
storing color data containing image information corresponding to each of the pixels of the active matrix bistable cholesteric LCD;
storing status data different from the color data, the status data also corresponding to each of the pixels of the active matrix bistable cholesteric LCD;
generating voltage data corresponding to the pixels of the active matrix bistable cholesteric LCD based on the color data and the status data stored for each of the pixels;
converting the voltage data to drive signals suitable for drying the pixels of the active matrix bistable cholesteric LCD to states of reflectance;
applying the drive signals to the active matrix bistable LCD effective to place the pixels in one of said reflectance states; and
maintaining said liquid crystal material of the pixels in said reflectance states such that all of said reflectance states are stable after removing the drive signals without application of any electric field.

23. The method as recited in claim 22, wherein the generating step is performed when the status data for the respective one of the pixels correspond to a non-zero binary number.

24. The method as recited in claim 22, wherein the generating, converting, and applying steps are repeated for a corresponding pixel N times, where N is an integer established by the status data.

25. A method of driving an active matrix bistable cholesteric LCD having a driver, the method comprising the steps of:
storing color data containing image information corresponding to each of the pixels of the active matrix bistable cholesteric LCD;
storing status data corresponding to each of the pixels of the active matrix bistable cholesteric LCD, with the status data having a value representing a positive integer;
generating voltage data for each respective one of the pixels of the active matrix bistable cholesteric LCD based on the color data and the status data for each pixel;
repeating the generating step for a corresponding pixel N times, wherein N is an integer established by the status data;
converting the voltage data to drive signals suitable for driving the pixels of the active matrix bistable cholesteric LCD to states of reflectance;
applying the drive signals to the pixels of the active matrix bistable cholesteric LCD effective to olace the pixels in one of said reflectance states; and maintaining said liquid crystal material of the pixels in said reflectance states such that all of said reflectance states are stable after removing the drive signals without application of any electric field.

26. The method as recited in claim 25, wherein the driver has an on and an off state, the method further comprising the steps of:
    generating a sleep signal after said repeating step is completed; and
    switching the driver from the on state to the off state responsive to the sleep signal.

27. The method as recited in claim 25, further comprising the step of setting the status data to a predetermined value when corresponding color data for a respective one of the pixels is stored in the memory.

28. The method as recited in claim 25, wherein a first integer N corresponding to a first one of the pixels is not equal to a second integer N corresponding to a second one of the pixels.

29. The method as recited in claim 25, wherein a first integer N corresponding to a first one of the pixels is equal to a second integer N corresponding to a second one of the pixels.

30. The method as recited in claim 25, wherein: the method further comprises the steps of:
    examining the status data stored in the memory, the examining step being performed prior to the generating step; and
    the generating step comprises generating the voltage data for each respective one of the pixels having non-zero status data based on the color data and the status data for that pixel.

31. The method as recited in claim 25, wherein the method further comprises the steps of:
    examining the status data stored in the memory, the examining step being performed concurrent with the generating step; and
    the generating step comprises generating the voltage data for each respective one of the pixels having non-zero status data based on the color data and the status data for that pixel.

32. A method of driving a bistable LCD display having a driver, the method comprising the steps of:
    storing color data containing image information corresponding to each of the pixels;
    storing status data corresponding to each of the pixels, with the status data for a corresponding pixel having a value representing a non-zero positive integer;
    generating voltage data for each respective one of the pixels based on the color data and the status data for each pixel;
    decrementing the status data by 1 to thereby produce decremented status data for each pixel having the non-zero status data;
    overwriting the status data with the decremented status data for each pixel having the non-zero status data;
    repeating the generating, the decrementing, and the overwriting steps until the status data stored in the memory for all of the pixels represent a zero value, wherein a zero voltage is applied to the pixel after the status data becomes zero.

33. A method of operating a display driver for driving an active matrix bistable color cholesteric liquid crystal display having a plurality of pixels, said method for driving a pixel of said plurality of pixels, comprising the steps of:
    examining previous pixel information;
    examining updated pixel information;
    when the updated pixel information has changed from the previous pixel information, applying drive signals to the pixel to reflect the updated pixel information effective to place the pixel into a new state of reflectance; and
    when the updated pixel information has not changed from the previous pixel information, applying a zero or near zero maintenance voltage to the pixel according to maintain the current pixel information to maintain a current state of reflectance of the pixel,
    wherein all states of reflectance of the pixel are stable after removing said drive signals and said maintenance voltage without application of any electric field.

34. An operating method for a display system including an active matrix cholesteric liquid crystal display (LCD) having a plurality of pixels arranged in a matrix, comprising:
    storing image data and status data corresponding to the pixels of the active matrix cholesteric LCD;
    generating driving data corresponding to the pixels based on the image data and the status data stored for the pixels of the active matrix cholesteric LCD;
    converting the driving data to drive signals suitable for driving the pixels of the active matrix cholesteric LCD to levels of brightness;
    applying the drive signals to the pixels of the active matrix cholesteric LCD effective to place the pixels in one of said levels of brightness; and
    maintaining said liquid crystal material of the pixels of the active matrix cholesteric LCD in said levels of brightness such that all of said levels of brightness are stable after removing the drive signals without application of an electric field.

35. A method of driving an active matrix cholesteric liquid crystal display having a plurality of pixels, said method for driving a pixel of said plurality of pixels comprising the steps of:
    examining previous pixel information;
    examining updated pixel information;
    when the updated pixel information has changed from the previous pixel information, applying drive signals to the pixel according to the updated pixel information effective to place the pixel in a new level of brightness; and
    when the updated pixel information has not changed from the previous pixel information, applying a zero or near zero maintenance voltage according to the current pixel information to maintain a current level of brightness of the pixel,
    wherein all levels of brightness of the pixel are stable after removing said drive signals and said maintenance voltage without application of any electric field.

* * * * *

UNITED STATES PATENT AND TRADEMARK OFFICE
CERTIFICATE OF CORRECTION

PATENT NO. : 6,850,217 B2
DATED : February 1, 2005
INVENTOR(S) : Xiao-Yang Huang and Nick Martin Miller, IV It is certified that error appears in the above-identified patent and that said Letters Patent is hereby corrected as shown below:

Column 5,
Line 7, delete "The" and insert -- Preferably, the --.

Column 10,
Line 58, "been" should be -- between --.

Column 11,
Line 30, "502 a" should be -- 502a --.

Column 17,
Line 29, before "A" delete "An".

Column 18,
Line 27, "drying" should be -- driving --.

Column 20,
Line 17, delete "maintain". (first occurrence)
Line 41, "an" should be -- any --.

Signed and Sealed this

Tenth Day of May, 2005

JON W. DUDAS
*Director of the United States Patent and Trademark Office*